US011729332B2

(12) United States Patent
Yamada et al.

(10) Patent No.: US 11,729,332 B2
(45) Date of Patent: Aug. 15, 2023

(54) LIGHT SOURCE UNIT IN WHICH SURFACE OPPOSITE TO LIGHT EMITTING ELEMENT OF LIGHT GUIDE IS NOT COVERED AND MEDIUM SIDE SURFACE OF REFLECTOR PROTRUDES FROM LIGHT GUIDE

(71) Applicant: PFU LIMITED, Kahoku (JP)

(72) Inventors: Eiki Yamada, Kahoku (JP); Kengo Nakano, Kahoku (JP)

(73) Assignee: PFU LIMITED, Kahoku (JP)

( * ) Notice: Subject to any disclaimer, the term of this patent is extended or adjusted under 35 U.S.C. 154(b) by 4 days.

(21) Appl. No.: 17/473,582

(22) Filed: Sep. 13, 2021

(65) Prior Publication Data

US 2022/0166897 A1     May 26, 2022

(30) Foreign Application Priority Data

Nov. 25, 2020   (JP) ................. 2020-195083

(51) Int. Cl.
| | |
|---|---|
| *H04N 1/04* | (2006.01) |
| *H04N 1/028* | (2006.01) |
| *F21V 8/00* | (2006.01) |
| *H04N 1/195* | (2006.01) |
| *H04N 1/12* | (2006.01) |

(52) U.S. Cl.
CPC ....... *H04N 1/02835* (2013.01); *G02B 6/0051* (2013.01); *G02B 6/0055* (2013.01); *H04N 1/02825* (2013.01); *H04N 1/1215* (2013.01); *H04N 1/195* (2013.01)

(58) Field of Classification Search
CPC .......... H04N 1/02835; H04N 1/02825; H04N 1/1215; H04N 1/195; G02B 6/0051; G02B 6/0055

USPC .............. 358/484, 475, 482, 483, 496, 497; 399/211; 250/208.1, 234–236, 239
See application file for complete search history.

(56) References Cited

U.S. PATENT DOCUMENTS

| | | | |
|---|---|---|---|
| 6,351,594 B1 | 2/2002 | Nakamura et al. | |
| 7,802,899 B2 * | 9/2010 | Ikeda ................. | H04N 1/02815 362/555 |
| 2017/0064125 A1 * | 3/2017 | Tsumekawa ......... | H04N 1/0289 |

FOREIGN PATENT DOCUMENTS

| | | |
|---|---|---|
| JP | 10-150526 A | 6/1998 |
| JP | 2004-312753 A | 11/2004 |

\* cited by examiner

*Primary Examiner* — Cheukfan Lee
(74) *Attorney, Agent, or Firm* — Lewis Roca Rothgerber Christie LLP

(57) ABSTRACT

An imaging device includes a light source unit located so as to be inclined with respect to a medium conveying surface or a medium placing surface. The light source unit includes a light emitting element, a light guide provided with the light emitting element on a first end surface side, to guide light emitted from the light emitting element in a predetermined direction, and emit the light toward the medium from an emitting surface extending in the predetermined direction, and a reflector located around the light guide other than the emitting surface. The light guide includes a light diffusing surface on an opposite side to the emitting surface. The reflector does not cover a second end surface opposite to the first end surface of the light guide. A medium side surface of the reflector is located so as to protrude from the second end surface of the light guide.

6 Claims, 16 Drawing Sheets

LIGHT SOURCE UNIT IN WHICH SURFACE OPPOSITE TO LIGHT EMITTING ELEMENT OF LIGHT GUIDE IS NOT COVERED AND MEDIUM SIDE SURFACE OF REFLECTOR PROTRUDES FROM LIGHT GUIDE

CROSS-REFERENCE TO RELATED APPLICATIONS

This application is based upon and claims the benefit of priority of prior Japanese Patent Application No. 2020-195083, filed on Nov. 25, 2020, the entire contents of which are incorporated herein by reference.

TECHNICAL FIELD

Embodiments discussed in the present specification relate to imaging a medium.

BACKGROUND

In general, an image reading apparatus such as a scanner images a document while emitting light to the document using an imaging device having an imaging sensor and a light source. Such an imaging device is required to emit uniformly light to the medium, as a good image is generated.

A linear illumination apparatus including a light guide made of a light-transmitting material, a light refraction and/or reflection region provided on one side surface in a longitudinal direction of the light guide, and a light source provided on both end surfaces of the light guide, is disclosed (see Japanese Unexamined Patent Application Publication (Kokai) No. H10-150526). The linear illumination apparatus forms the light refraction and/or reflective region with a number of refraction/reflective surfaces having triangle wave shape.

A linear illumination apparatus including light guide having a light-transmitting property, a light refraction and reflection region provided on one side surface in a longitudinal direction of the light guide, and a light source provided on one end surface of the light guide, is disclosed (see Japanese Unexamined Patent Application Publication (Kokai) No. 2004-312753). The linear illumination apparatus includes the light refraction and reflection region composed of a triangle wave surface, and a diffusion surface covering the light refraction and reflection region across a space, and a cross-sectional area of the light guide is gradually reduced, from one end surface where the light source is located toward the other end surface in the longitudinal direction.

SUMMARY

According to some embodiments, an imaging device includes an imaging sensor to image a medium, and a light source unit located so as to be inclined with respect to a medium conveying surface or a medium placing surface, to emit light to the medium. The light source unit includes a light emitting element, a light guide provided with the light emitting element on a first end surface side, to guide light emitted from the light emitting element in a predetermined direction, and emit the light toward the medium from an emitting surface extending in the predetermined direction, and a reflector located around the light guide other than the emitting surface. The light guide includes a light diffusing surface on an opposite side to the emitting surface. The reflector does not cover a second end surface opposite to the first end surface of the light guide. A medium side surface of the reflector is located so as to protrude from the second end surface of the light guide.

According to some embodiments, an image reading apparatus includes a conveyance roller to convey a medium, an imaging sensor to image a medium, and a light source unit located so as to be inclined with respect to a medium conveying surface, to emit light to the medium. The light source unit includes a light emitting element, a light guide provided with the light emitting element on a first end surface side, to guide light emitted from the light emitting element in a predetermined direction, and emit the light toward the medium from an emitting surface extending in the predetermined direction, and a reflector located around the light guide other than the emitting surface. The light guide includes a light diffusing surface on an opposite side to the emitting surface. The reflector does not cover the second end surface opposite to the first end surface of the light guide. A medium side surface of the reflector is located so as to protrude from the second end surface of the light guide.

According to some embodiments, image reading apparatus includes an imaging device, and a motor to move the imaging device. The imaging device includes an imaging sensor to image a medium, and a light source unit located so as to be inclined with respect to a medium placing surface, to emit light to the medium. The light source unit includes a light emitting element, a light guide provided with the light emitting element on a first end surface side, to guide light emitted from the light emitting element in a predetermined direction, and emit the light toward the medium from an emitting surface extending in the predetermined direction, and a reflector located around the light guide other than the emitting surface. The light guide includes a light diffusing surface on an opposite side to the emitting surface. The reflector does not cover the second end surface opposite to the first end surface of the light guide. A medium side surface of the reflector is located so as to protrude from the second end surface of the light guide.

BRIEF DESCRIPTION OF DRAWINGS

FIG. 4 is a perspective view of the first imaging device 115a.

FIG. 6 is a perspective view of a first light source unit 130a.

FIG. 8 is a further enlarged view of the first light source unit 130a.

FIG. 9 is a plan view of the first light source unit 130a.

FIG. 10 is a side view of the first light source unit 130a.

FIG. 11 is a side view of the first light source unit 130a.

DESCRIPTION OF EMBODIMENTS

It is to be understood that both the foregoing general description and the following detailed description are exemplary and explanatory, and are not restrictive of the invention, as claimed.

Hereinafter, an imaging device and an image reading apparatus according to an embodiment, will be described with reference to the drawings. However, it should be noted that the technical scope of the invention is not limited to these embodiments, and extends to the inventions described in the claims and their equivalents.

Figure 1:
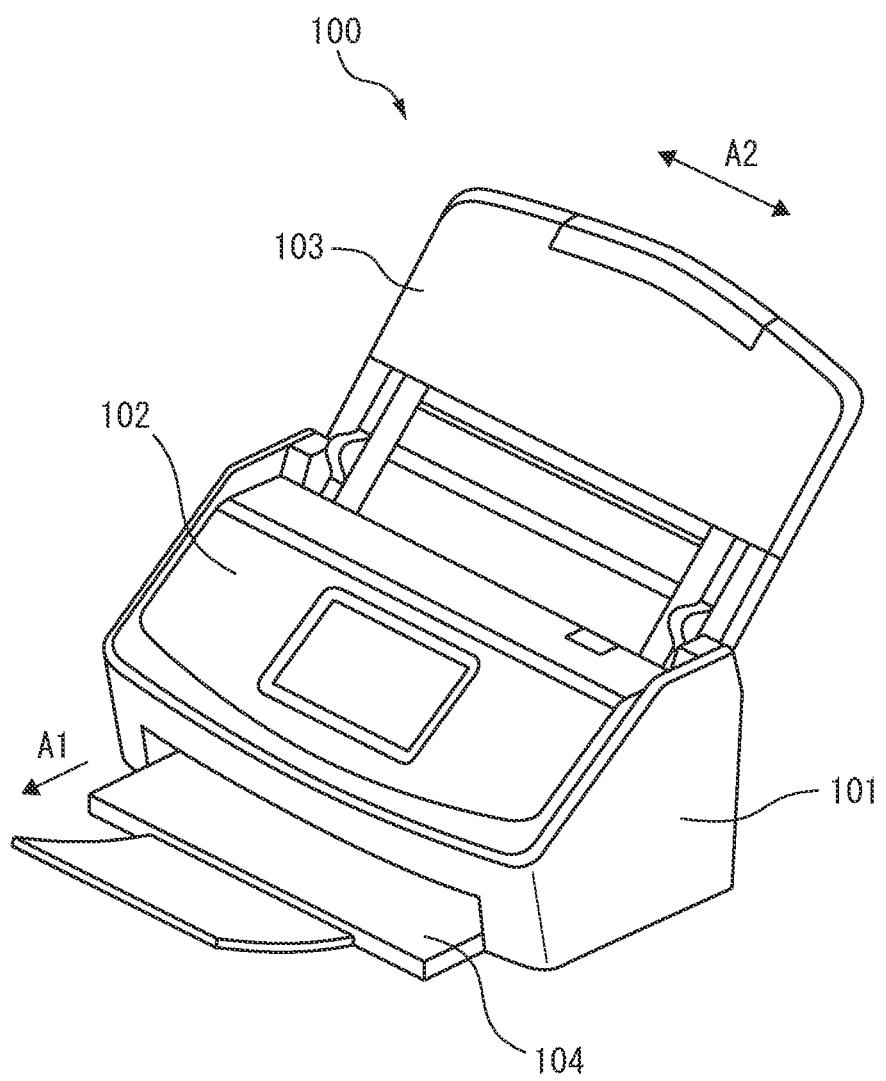
FIG. 1 is a configuration diagram of an example of an image reading apparatus 100 according to an embodiment.

FIG. 1 is a configuration diagram of an example of an image reading apparatus 100 according to an embodiment. FIG. 1 is a perspective view of an image reading apparatus 100.

As illustrated in FIG. 1, the image reading apparatus 100 is, for example, an ADF (Auto Document Feeder) type scanner, etc., to convey and image a medium that is a document. The medium is a paper, a thick paper, a card, etc. The image reading apparatus 100 may be a facsimile, a copying machine, a printer multifunction machine (MFP, Multifunction Peripheral), etc.

The image reading apparatus 100 includes a lower housing 101, an upper housing 102, a medium tray 103, an ejection tray 104, etc.

The upper housing 102 is located at a position covering an upper surface of the image reading apparatus 100 and is engaged with the lower housing 101. The medium tray 103 is engaged with the lower housing 101 in such a way as to be able to place a medium to be conveyed. The ejection tray 104 is engaged with the lower housing 101 in such a way as to be able to hold an ejected medium.

In FIG. 1, an arrow A1 indicates a medium conveying direction, and an arrow A2 indicates a width direction perpendicular to the medium conveying direction A1. An upstream hereinafter refers to an upstream in the medium conveying direction A1, and a downstream refers to a downstream in the medium conveying direction A1.

Figure 2:
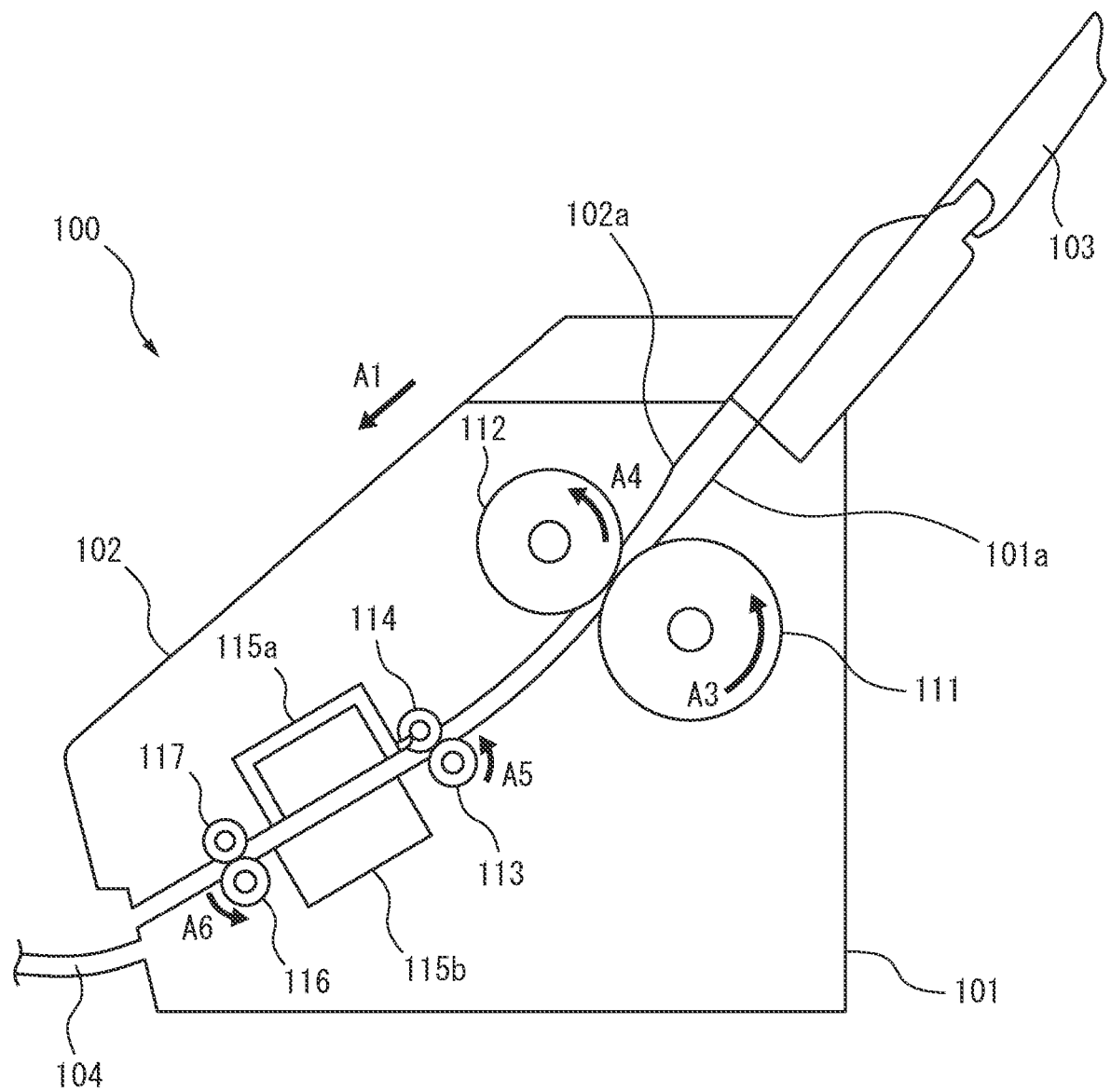
FIG. 2 is a diagram for illustrating a conveyance path inside the image reading apparatus 100.

FIG. 2 is a diagram for illustrating a conveyance path inside the image reading apparatus 100.

The conveying path inside the image reading apparatus 100 includes a feed roller 111, a retard roller 112, a first conveying roller 113, a first driven roller 114, a first imaging device 115a, a second imaging device 115b, a second conveying roller 116 and a second driven roller 117, etc. The numbers of each roller is not limited to one, and may be plural. Hereinafter, the first imaging device 115a and the second imaging device 115b may be collectively referred to as an imaging device 115.

A top surface of the lower housing 101 forms a lower guide 101a of a conveyance path of a medium, and a bottom surface of the upper housing 102 forms an upper guide 102a of the conveyance path of a medium. The feed roller 111, the retard roller 112, the first conveying roller 113, the first driven roller 114, the second conveying roller 116 and the second driven roller 117 is an example of a conveyance roller, and conveys the medium.

A medium placed on the medium tray 103 is conveyed between the upper guide 102a and the lower guide 101a in the medium conveying direction A1 by the feed roller 111 rotating in a direction of an arrow A3 in FIG. 2. When a medium is conveyed, the retard roller 112 rotates in a direction of an arrow A4. By the workings of the feed roller 111 and the retard roller 112, when a plurality of media are placed on the medium tray 103, only a medium in contact with the feed roller 111, out of the media placed on the medium tray 103, is separated. Consequently, the image reading apparatus 100 operates in such a way that conveyance of a medium other than the separated medium is restricted (prevention of multi-feed).

The medium is fed between the first conveying roller 113 and the first driven roller 114 while being guided by the upper guide 102a and the lower guide 101a. The medium is fed between the first imaging device 115a and the second imaging device 115b by the first conveying roller 113 rotating in a direction of an arrow A5. The medium read by the imaging device 115 is ejected on the ejection tray 104 by the second conveying roller 116 rotating in a direction of an arrow A6.

Figure 3:
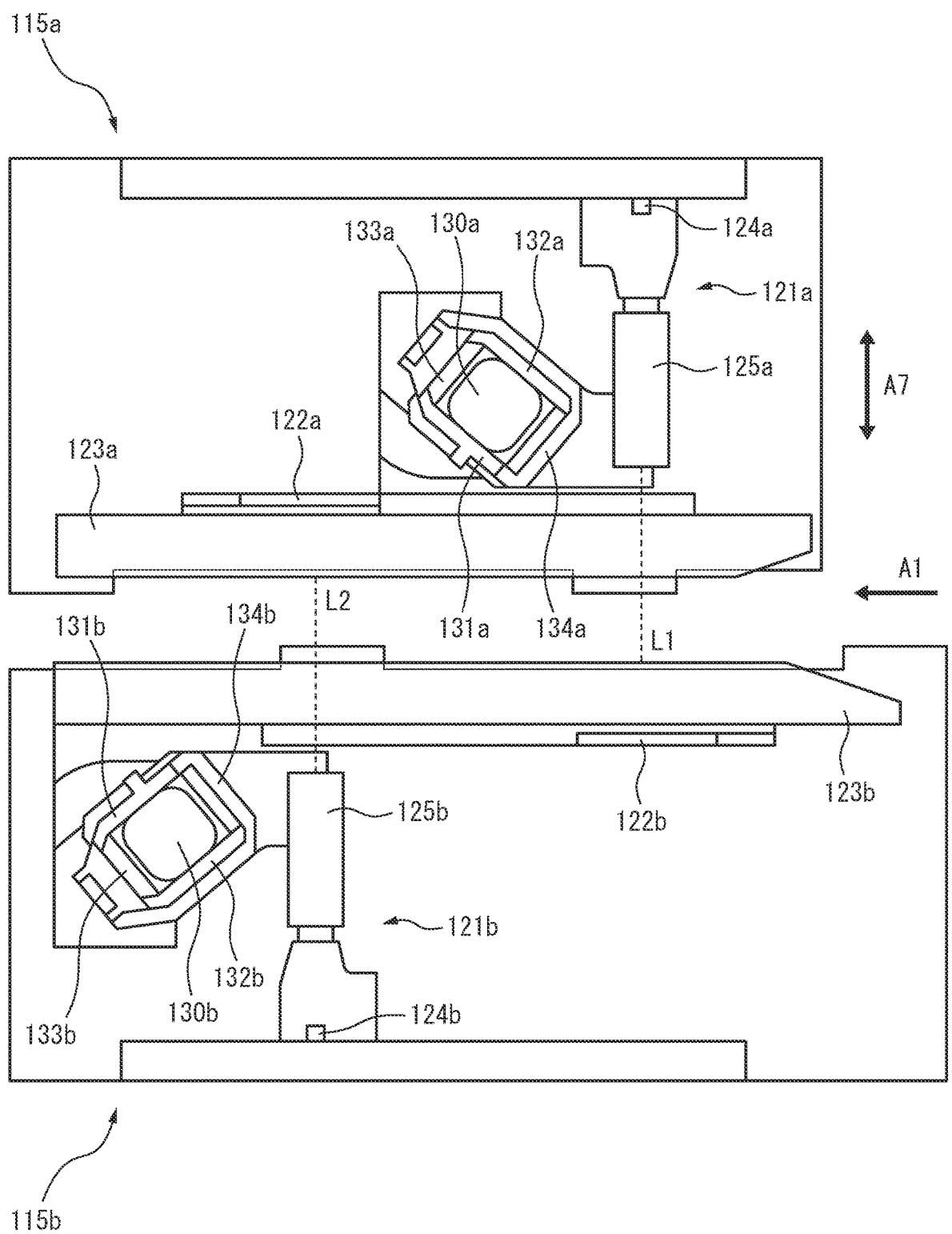
FIG. 3 is a cross-sectional view of a first imaging device 115a and a second imaging device 115b.
Figure 4:
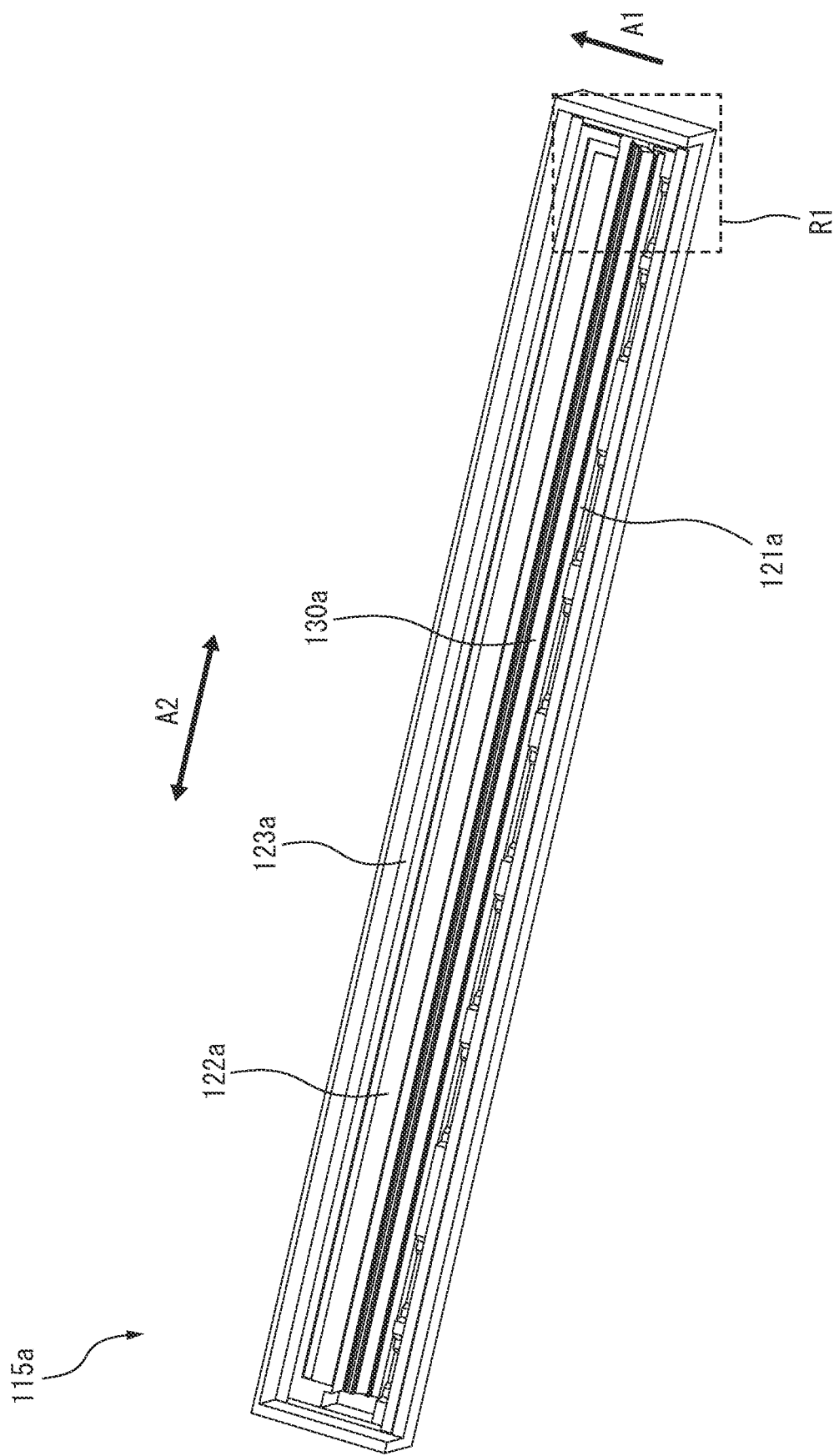
Figure 5:
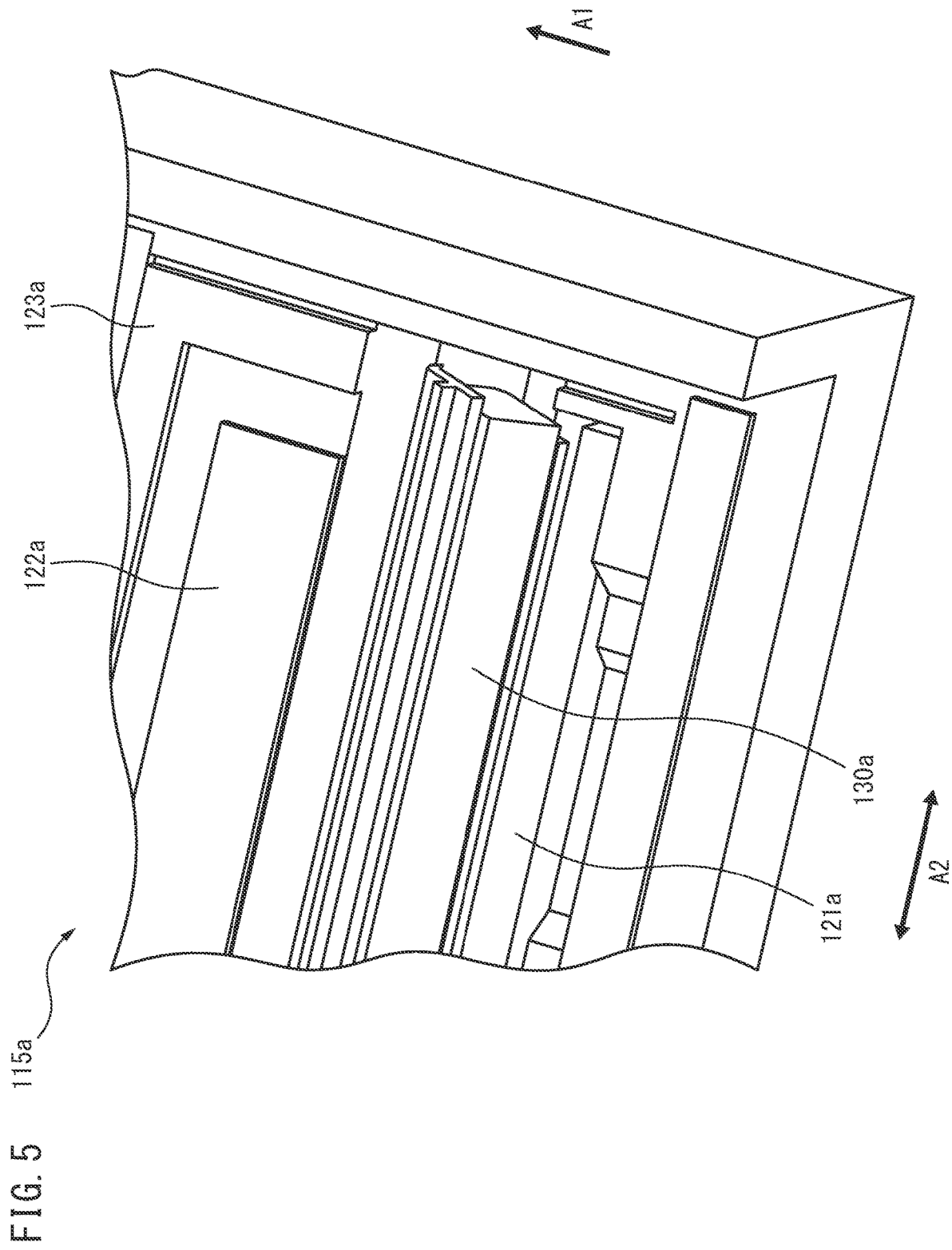
FIG. 5 is an enlarged view of a region R1 of FIG. 4.

FIG. 3 is a cross-sectional view of the first imaging device 115a and the second imaging device 115b as viewed from the side. FIG. 4 is a perspective view of the first imaging device 115a as viewed from the medium conveyance path side. FIG. 5 is an enlarged view of a region R1 of FIG. 4.

As illustrated in FIG. 3, the first imaging device 115a is located above the second imaging device 115b so as to face the second imaging device 115b. The first imaging device 115a and the second imaging device 115b are examples of an imaging device. The first imaging device 115a images a back surface of the conveyed medium, and the second imaging device 115b images a front surface of the conveyed medium. While the second imaging device 115b is fixed to the lower housing 101, the first imaging device 115a is supported by the upper housing 102 so as to be movable in a height direction A7 perpendicular to the medium conveyance path. An urging spring (not shown) is provided above the first imaging device 115a. The first imaging device 115a is urged by the urging spring in a direction toward the second imaging device 115b side. When a medium such as a card is conveyed, the first imaging device 115a is pushed up by the medium.

As illustrated in FIGS. 3 to 5, the first imaging device 115a includes a first imaging unit 121a, a first reference member 122a, a first light transmissive member 123a, a first light source unit 130a, etc. Further, as shown in FIG. 3, the second imaging device 115b includes a second imaging unit 121b, a second reference member 122b, a second light transmissive member 123b and a second light source unit 130b, etc.

The first imaging unit 121a is located on the opposite side of the second reference member 122b with the first light transmissive member 123a and the second light transmissive member 123b interposed therebetween. The first imaging unit 121a includes an imaging sensor 124a. The imaging sensor 124a includes a plurality of imaging elements spaced and located alongside in the width direction A2, that is, a main scanning direction, and images the conveyed medium. The imaging sensor 124a is, for example, a line sensor based on a unity-magnification optical system type contact image sensor (CIS) including an imaging element based on a complementary metal oxide semiconductor (CMOS) linearly located in a main scanning direction. The first imaging unit 121a includes a lens 125a for forming an image on the imaging element, and an analog-digital (A/D) converter (not shown) for amplifying and A/D converting an electric signal output from the imaging element. The first imaging unit 121a images the back surface of the medium conveyed between the first imaging device 115a and the second imaging device 115b, and the periphery of the medium at the imaging position L1 to generate and output an input image. When the medium is not conveyed, the first imaging unit 121a images the second reference member 122b.

Similarly, the second imaging unit 121b is located on the opposite side of the first reference member 122a with the second light transmissive member 123b and the first light transmissive member 123a interposed therebetween. The second imaging unit 121b includes an imaging sensor 124b. The imaging sensor 124b includes a plurality of imaging elements spaced and located alongside in the main scanning direction, and images the conveyed medium. The imaging sensor 124b is, for example, a line sensor according to the CIS of the same magnification optical system type having an imaging device by CMOS linearly arranged in the main scanning direction. The second imaging unit 121b includes a lens 125b for forming an image on the imaging element, and an A/D converter (not shown) for amplifying and A/D converting an electric signal output from the imaging element. The second imaging unit 121b images the front surface of the medium conveyed between the first imaging device 115a and the second imaging device 115b, and the periphery of the medium at the imaging position L2 to generate and output an input image. The second imaging unit 121b images the first reference member 122a when the medium is not conveyed.

A line sensor based on a unity-magnification optical system type CIS including an imaging element based on charge coupled devices (CCDs) may be used in place of the line sensor based on a unity-magnification optical system type CIS including an imaging element based on a CMOS, as the imaging sensor. Further, a line sensor based on a reduction optical system type line sensor including an imaging element based on CMOS or CCDs, as an imaging sensor.

The first reference member 122a is provided above the first light transmissive member 123a and at a position facing the second imaging unit 121b and the second light source unit 130b of the second imaging device 115b. A surface facing the second imaging unit 121b of the first reference member 122a has a white color. Similarly, the second reference member 122b is located below the second light transmissive member 123b and at a position facing the first imaging unit 121a and the first light source unit 130a of the first imaging device 115a. A surface facing the first imaging unit 121a of the second reference member 122b has a white color. The image reading apparatus 100 executes an image correction such as shading correction, based on image signals acquired by imaging the first reference member 122a and the second reference member 122b.

The first light transmissive member 123a and the second light transmissive member 123b are formed of transparent glass. The first light transmissive member 123a and the second light transmissive member 123b may be formed of transparent plastic, etc. The second light transmissive member 123b and the lower guide 101a of the lower housing 101 form a medium conveying surface.

The first light source unit 130a is provided on the opposite side of the second reference member 122b with the first light transmissive member 123a and the second light transmissive member 123b interposed therebetween, and on the downstream side of the first imaging unit 121a in the medium conveying direction A1. The first light source unit 130a is an example of a light source unit, and is located so as to be inclined with respect to the medium conveying surface, to emit light to the conveyed medium. That is, an emitting direction of the light by the first light source unit 130a is inclined (not perpendicular) with respect to the medium conveying surface, and is inclined (not parallel) with respect to the imaging direction by the first imaging unit 121a. The first light source unit 130a emits light toward the back surface of the medium conveyed to the position of the imaging device 115 (toward the second reference member 122b facing the first light source unit 130a when a medium is not conveyed).

The first light source unit 130a includes a medium side surface 131a located on the medium side (on the medium conveying surface side), a non-medium side surface 132a located on the opposite side of the medium side surface 131a (on the inner side of the upper housing 102), and a bottom surface 133a. The first light source unit 130a is provided with an opening 134a on the side toward the imaging position L1 so that the first light source unit 130a emits light toward the imaging position L1 of the first imaging device 115a.

Similarly, the second light source unit 130b is provided on the opposite side of the first reference member 122a with the second light transmissive member 123b and the first light transmissive member 123a interposed therebetween, and on the downstream side of the second imaging unit 121b in the medium conveying direction A1. The second light source unit 130b is an example of a light source unit, and is located so as to be inclined with respect to the medium conveying surface, to emit light to the conveyed medium. That is, the emitting direction of the light by the second light source unit 130b is inclined (not perpendicular) with respect to the medium conveying surface, and is inclined (not parallel) with respect to the imaging direction by the second imaging unit 121b. The second light source unit 130b emits light toward the front surface of the medium conveyed to the position of the imaging device 115 (toward the first reference member 122a facing the second light source unit 130b when a medium is not conveyed).

The second light source unit 130b includes a medium side surface 131b located on the medium side (the medium conveying surface side), a non-medium side surface 132b located on the opposite side of the medium side surface 131b (on the inner side of the lower housing 101), and a bottom surface 133b. The second light source unit 130b is provided with an opening 134b on the side toward the imaging position L2 so that the second light source unit 130b emits light toward the imaging position L2 of the second imaging device 115b.

Only either of the first imaging device 115a and the second imaging device 115b may be located in the image reading apparatus 100 and only one side of a medium may be read.

Figure 6:
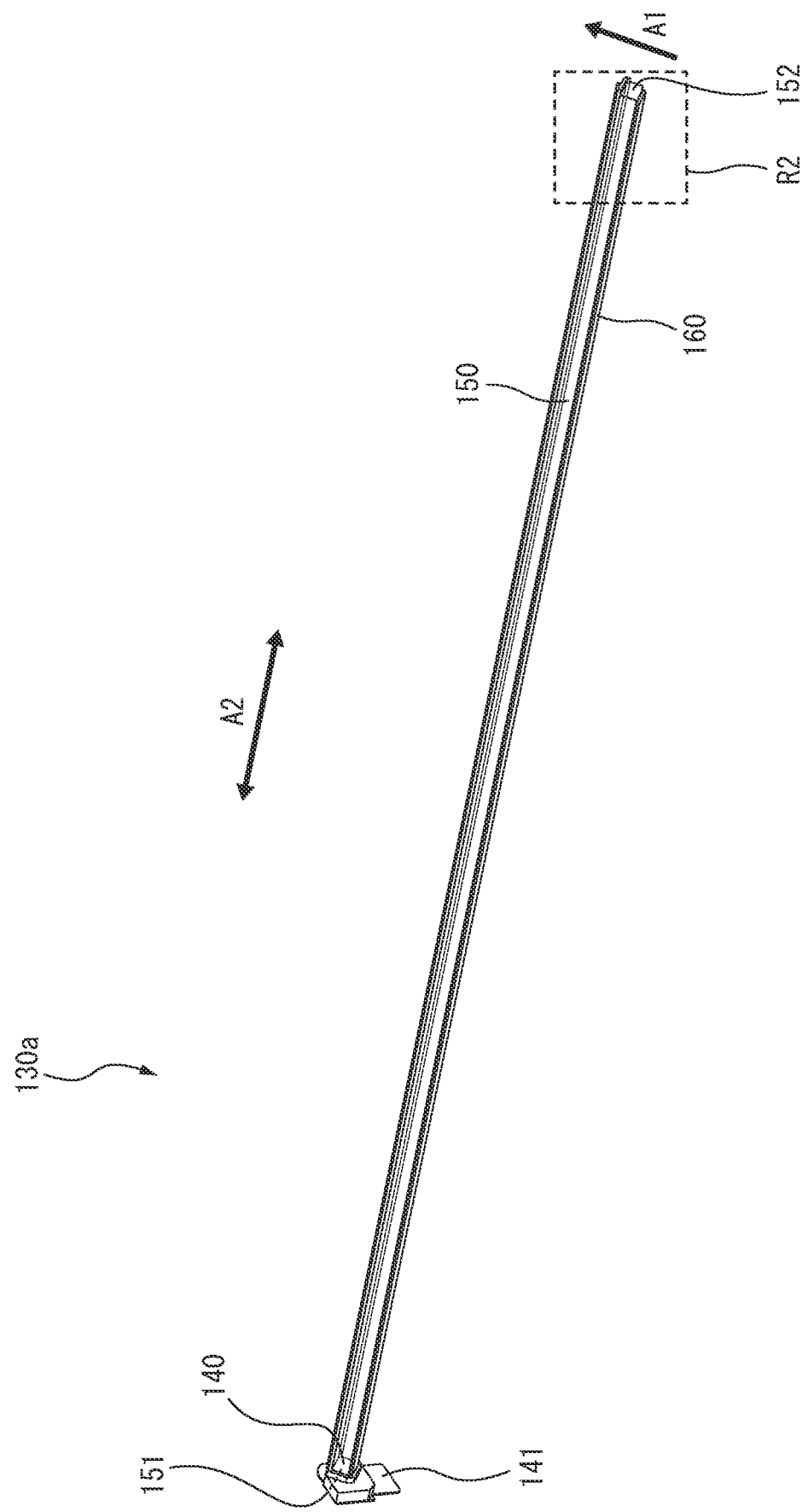
Figure 7:
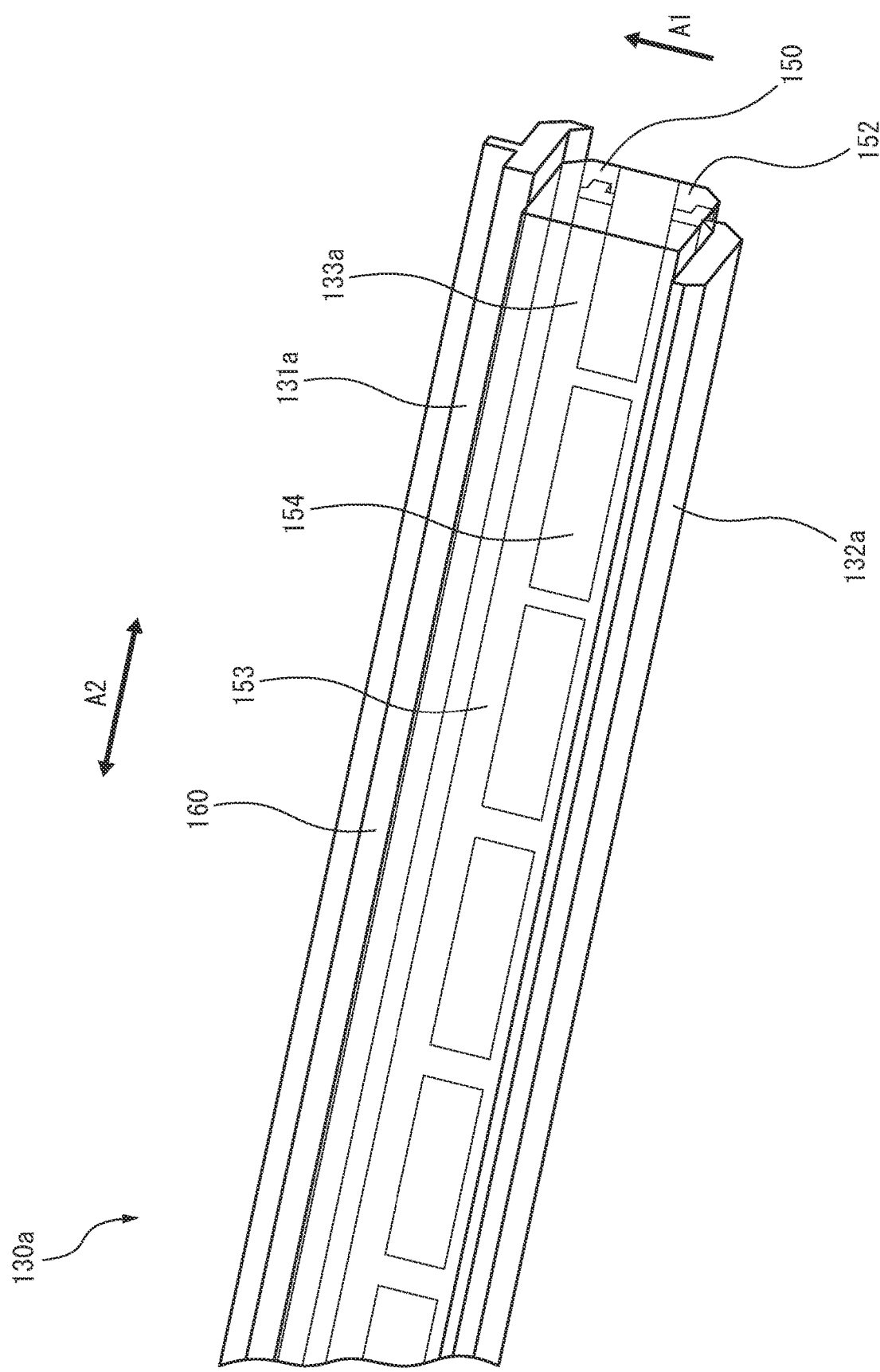
FIG. 7 is an enlarged view of a region R2 of FIG. 6.
Figure 8:
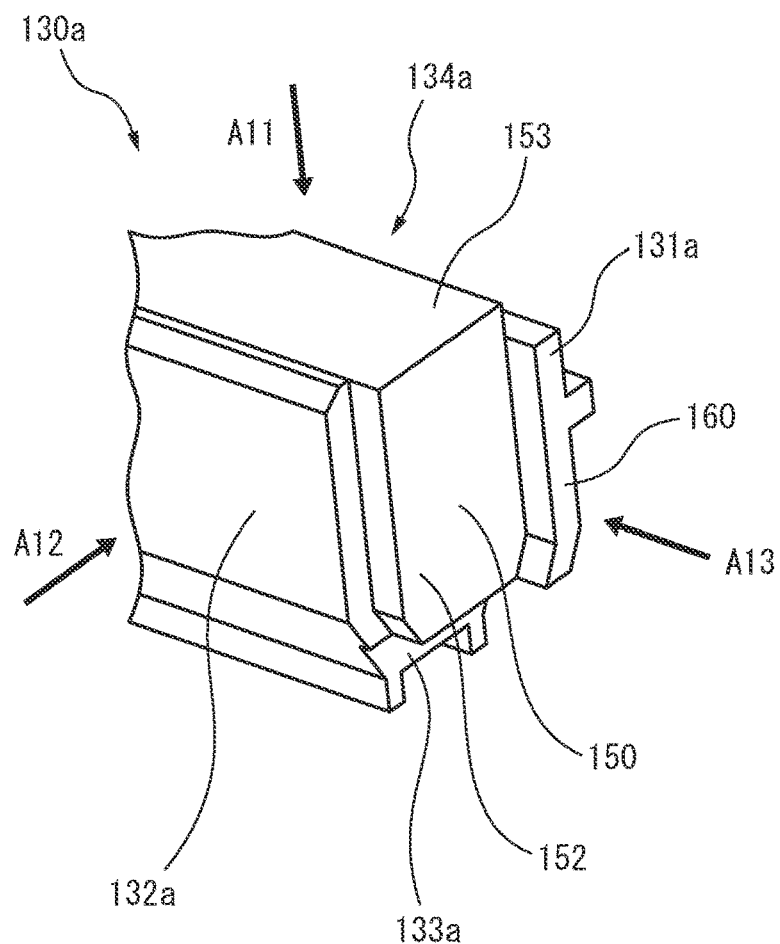
Figure 9:
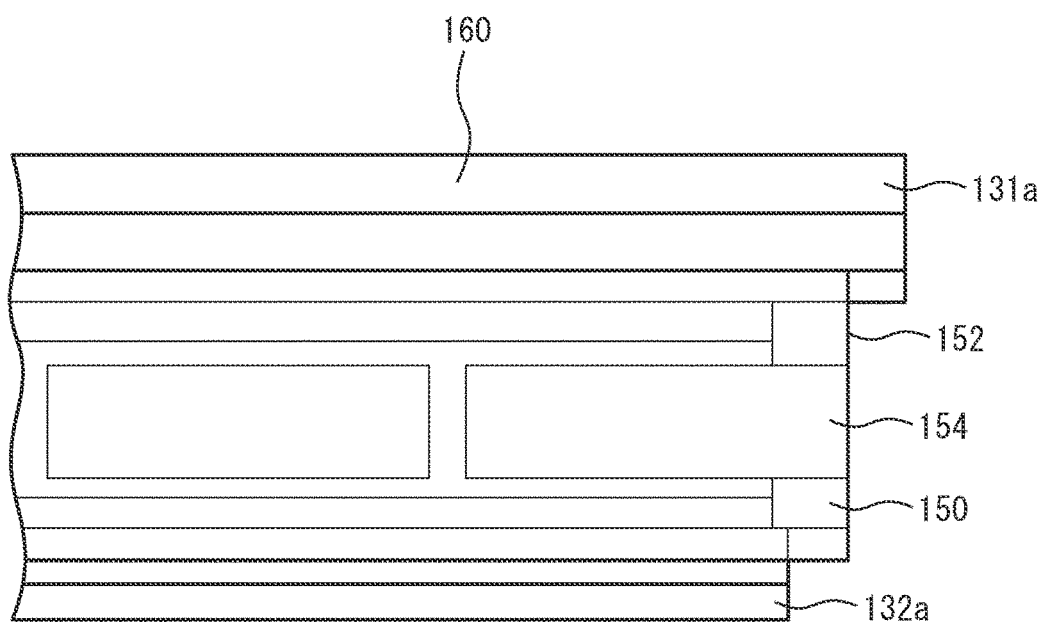
Figure 10:
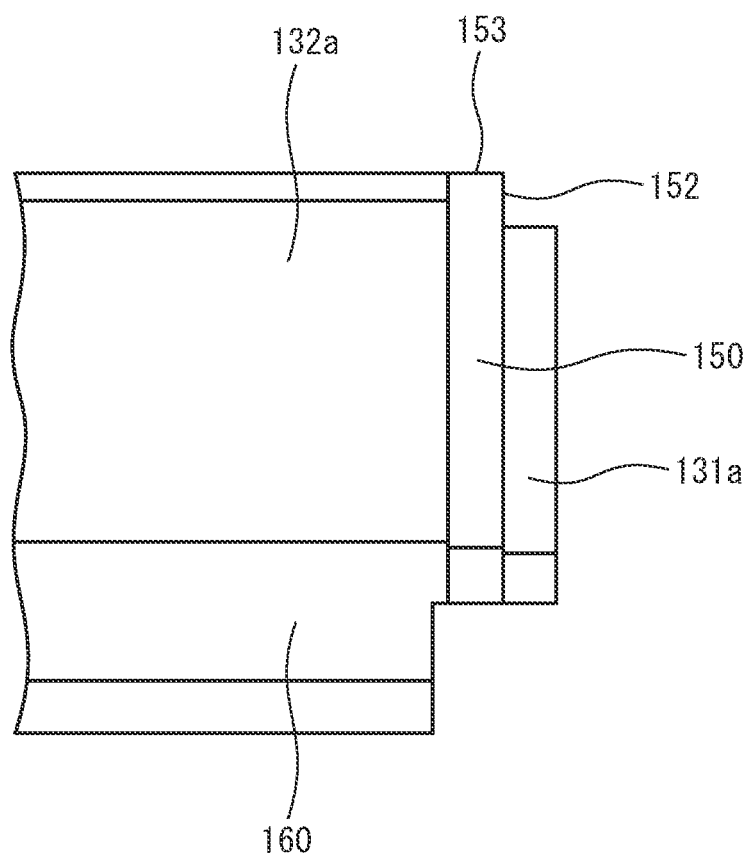
Figure 11:
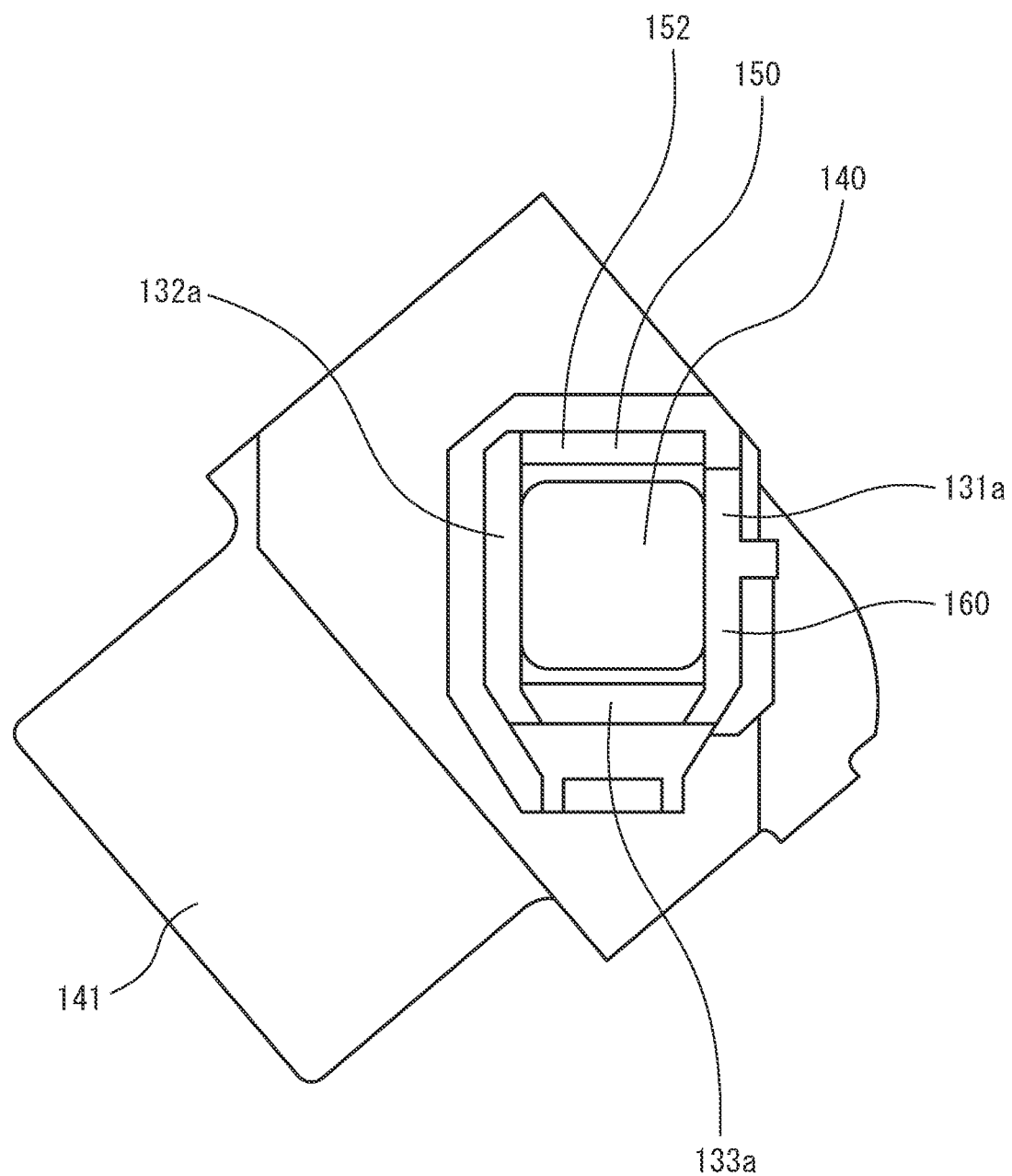

FIGS. 6 to 11 are schematic diagrams for illustrating the first light source unit 130a. FIG. 6 is a perspective view of the first light source unit 130a as viewed from the medium conveyance path side. FIG. 7 is an enlarged view of a region R2 of FIG. 6. FIG. 8 is a further enlarged view of the first light source unit 130a. FIG. 9 is a plan view of the first light source unit 130a as viewed from the opening 134a side (in a direction of an arrow A11 in FIG. 8). FIG. 10 is a side view of the first light source unit 130a as viewed from the side of the non-medium side surface 132a (in a direction of an arrow A12 in FIG. 8). FIG. 11 is a side view of the first light source unit 130a as viewed from one end side in the main scanning direction (in a direction of an arrow A13 in FIG. 8). Since the configurations of the first light source unit 130a and the second light source unit 130b are the same, the configuration of the first light source unit 130a will be described below as a representative.

As illustrated in FIGS. 6 to 8, the first light source unit 130a includes a light emitting element 140, a light guide member 150, a reflective member 160, etc.

As illustrated in FIG. 6, the light emitting element 140 is located on a first end surface 151 side of the light guide member 150 in the main scanning direction. The first end surface 151 is one end surface of the light guide member 150. The light emitting element 140 emits light toward a second end surface 152 side of the light guide member 150, along the main scanning direction in which the light guide member 150 extends. The second end surface 152 is the other end surface opposite to the first end surface 151 of the light guide member 150. As illustrated in FIGS. 6 and 11, the light emitting element 140 is fixed to the first imaging device 115a by being attached to a support member 141 attached to the first imaging device 115a.

As illustrated in FIGS. 6 to 8, the light guide member 150 is an example of a light guide, and is a light guide tube such as a prism extending along the main scanning direction. The light guide member 150 guides the light emitted from the light emitting element 140 located on the first end surface 151 side toward the second end surface 152 in the main scanning direction. The light guide member 150 emits the light emitted from the light emitting element 140, from an emitting surface 153 which is located on the opening 134a side of the first light source unit 130a and extends in the main scanning direction, toward the medium conveying surface, i.e., toward the medium.

As illustrated in FIGS. 7 and 9, the light guide member 150 includes a light diffusing surface 154 on the opposite side to the emitting surface 153, i.e. at a position facing the emitting surface 153. The light diffusing surface 154 is formed by, for example, silk printing. The light diffusing surface 154 may be formed by slits or dots. The light diffusing surface 154 is provided so as to extend to the second end surface 152 of the light guide member 150. The light diffusing surface 154 may not extend to a position reaching the second end surface 152 of the light guide member 150, it may be provided so as to extend to a position within a predetermined distance (e.g., 1 mm) from the second end surface 152 of the light guide member 150. The light guide member 150 diffuses the light emitted from the light emitting element 140 by the light diffusing surface 154.

As illustrated in FIGS. 6 to 8, the reflective member 160 is an example of a reflector, and is a case that forms an outer frame of the first light source unit 130a. The reflective member 160 is located around the light guide member 150 other than the emitting surface 153. The reflective member 160 has a white reflecting surface on the inside, to reflect the light emitted from the light emitting element 140 and guided by the light guide member 150. The reflective member 160 irregularly reflects the light emitted from the light emitting element 140 into the light guide member 150. The reflective member 160 includes the medium side surface 131a, the non-medium side surface 132a, and the bottom surface 133a of the first light source unit 130a, and is formed in a U-shape. The medium side surface 131a, the non-medium side surface 132a, and the bottom surface 133a are provided so as to extend in the main scanning direction, and the reflective member 160 is provided with an opening 134a extending in the main scanning direction by the medium side surface 131a and the non-medium side surface 132a.

As illustrated in FIGS. 8 to 11, the reflective member 160 does not cover the second end surface 152 of the light guide member 150, and the second end surface 152 of the light guide member 150 is exposed. As illustrated in FIGS. 9 and 10, the second end surface 152 of the light guide member 150 is located so as to protrude from the non-medium side surface 132a of the reflective member 160. For example, a length by which the second end surface 152 protrudes from the non-medium side surface 132a is set to 0.1 mm or more and 10 mm or less, more preferably 0.3 mm or more and 1.0 mm or less.

The medium-side side surface 131a of the reflective member 160 is located so as to protrude from the second end surface 152 of the light guide member 150. For example, a length by which the medium-side side surface 131a protrudes from the second end surface 152 is set to 0.1 mm or more and 10 mm or less, more preferably 0.3 mm or more and 1.0 mm or less.

In the main scanning direction, the end portions of the light guide member 150 and the reflective member 160 on the light emitting element 140 side are located at substantially the same position. In the main scanning direction, the non-medium side surface 132a is formed to be shorter than the light guide member 150, and the medium side surface 131a is formed to be longer than the light guide member 150. Thus, the end portion of the second end surface 152 side of the light guide member 150 is exposed toward the opposite side of the medium conveying surface, and is shielded toward the medium conveying surface side.

The second end surface 152 of the light guide member 150 may not protrude from the non-medium side surface 132a of the reflective member 160, and may be provided so as to be flush with the non-medium side surface 132a.

As illustrated in FIGS. 8 and 10, in the light emission direction, the emitting surface 153 of the light guide member 150 is located so as to project from the medium side surface 131a of the reflective member 160. Thus, the first light source unit 130a can increase an amount of the light emitted toward the medium conveying surface. The emitting surface 153 may be located so as to be flush with the medium side surface 131a in the light emission direction.

Hereinafter, the technical meaning that the second end surface 152 of the light guide member 150 is located to protrude from the non-medium side surface 132a and the medium side surface 131a is located to protrude from the second end surface 152 of the light guide member 150 will be described.

Figure 12A:
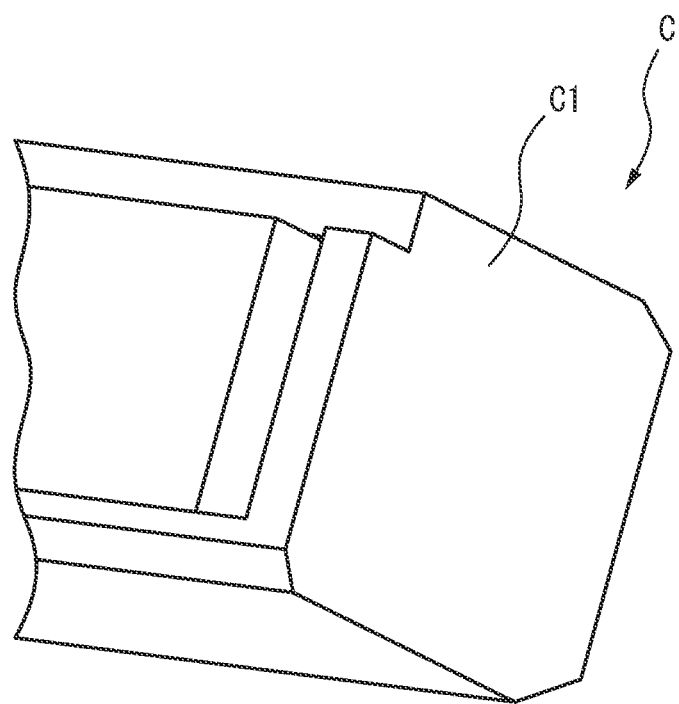
FIG. 12A is a schematic diagram illustrating an example of a conventional light source unit L.

FIG. 12A is a schematic diagram illustrating an example of a conventional light source unit C.

As illustrated in FIG. 12A, in the conventional light source unit C, the end surface of the light guide member on the side where the light emitting element is not located is exposed, and covered by the reflective member C1.

Figure 12B:
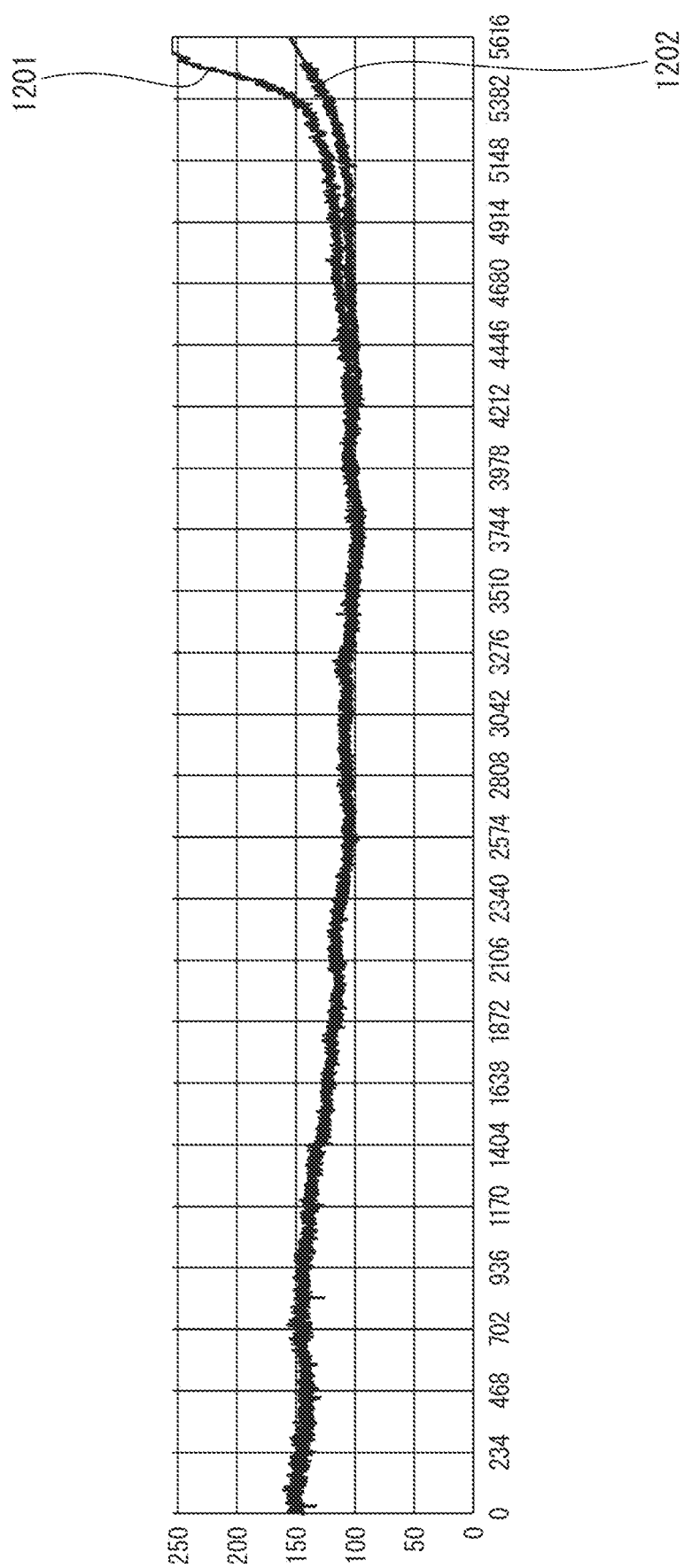
FIG. 12B is a graph illustrating a relationship between a distance from the light emitting element and an intensity of the light.

FIG. 12B is a graph illustrating a relation between a distance from the light emitting element in the main scanning direction of the light source unit and an intensity of light emitted from the light source unit. The horizontal axis of FIG. 12B indicates the distance from the light emitting element in the main scanning direction of the light source unit, the vertical axis indicates the intensity of the light emitted from the light source unit at the respective positions. A graph 1201 shows the relationship between the distance from the light emitting element and the intensity of the light emitted at each position in the conventional light source unit C. On the other hand, a graph 1202 shows the relationship between the distance from the light emitting element 140 and the intensity of light emitted at each position in the first light source unit 130a according to the present embodiment.

In the light source unit C, the end surface of the light guide member on the side where the light emitting element is not located is covered by the reflecting member C1. Therefore, the light emitted from the light emitting element is reflected by an inner surface of the reflective member C1 at the opposite end, is diffusely reflected between the reflective member (reflector) and the light guide member (prism), and is emitted from the emitting surface. Thus, as shown in the graph 1201, the intensity of the light emitted from the light source unit C is increased at the end of the side where the light emitting element is not located, the intensity of the light emitted from each position of the light source unit C is uneven. Therefore, in an image acquired by imaging a medium emitted with light by the light source unit C, the sensitivity non-uniformity (PRNU: Photo Response Non-Uniformity) is high, and variations occur in the output of the respective pixels in the main scanning direction. Further, when the amount of the light from the light emitting element is reduced in order to suppress an increase in the intensity of light at the end of the side where the light emitting element is not located, the noise in the image may be increased, and the SN ratio may be decreased.

On the other hand, in the first light source unit 130a according to the present embodiment, since the second end surface 152 of the light guide member 150 is exposed, the light emitted from the light emitting element 140 is emitted from the second end surface 152 in the main scanning direction without being reflected on the second end surface 152. In the first light source unit 130a, since the medium side surface 131a protrudes from the light guide member 150 on the second end surface 152 side, the light emitted from the second end surface 152 in the main scanning direction is blocked by the medium side surface 131a. Therefore, the light emitted from the second end surface 152 is suppressed from leaking to the medium conveying surface side.

In the first light source unit 130a, the light guide member 150 protrudes from the non-medium side surface 132a on the second end surface 152 side. Therefore, on the second end surface 152 side, reflection of light by the non-medium side surface 132a is suppressed, and an increase in the amount of the light emitted from the emitting surface side is suppressed. Since the light guide member 150 protrudes from the non-medium side surface 132a, the light emitted from the second end surface 152 in the main scanning direction leaks to the opposite side of the medium conveying surface. However, since the light leaking to the opposite side of the medium conveying surface is absorbed by a wall surface inside the apparatus, the light does not leak to the medium conveyance path side, and does not affect the imaging of the medium.

Therefore, as shown in the graph 1202, in the first light source unit 130a, the increasing of the intensity of the light emitted in the vicinity of the second end surface 152 is suppressed, and the intensity of the light emitted from each position is uniform.

In particular, in the first light source unit 130a, the light diffusing surface 154 of the light guide member 150 is provided so as to extend to the second end surface 152. Therefore, the light guide member 150 is provided so as to diffuse the light to the second end surface 152. When the second end surface 152 is covered with a reflecting member, the intensity of the light emitted in the vicinity of the second end surface 152 is increased. For example, the light may be absorbed at the second end surface 152 by attaching a light absorbing member having a black color, etc., to the second end surface 152, or by applying a coating material having a black color, etc. However, in that case, the product cost is increased with an increase in the development man-hours for selecting a material that does not generate heat effects and an increase in the manufacturing work of the product. Also, variations in quality for each product may occur due to variations in work quality for each worker.

The first light source unit 130a can make the intensity of the light at each position uniform while suppressing an increase in the product cost and an occurrence of the variation in the quality for each product, by the medium side surface 131a protruding from the second end surface 152 and the second end surface 152 protruding from the non-medium side surface 132a. In the first light source unit 130a, a prism having a light diffusing surface formed in the main scanning direction and longer than the first light source unit 130a is cut at an arbitrary position, and can be used as the light guide member 150. Since the light guide member 150 can be manufactured from a prism having a standard size (e.g., A3 size) wherein the length in the main scanning direction is longer than that of the imaging sensors 124a and 124b, the first imaging device 115a and the image reading apparatus 100 can reduce the product cost.

Figure 13:
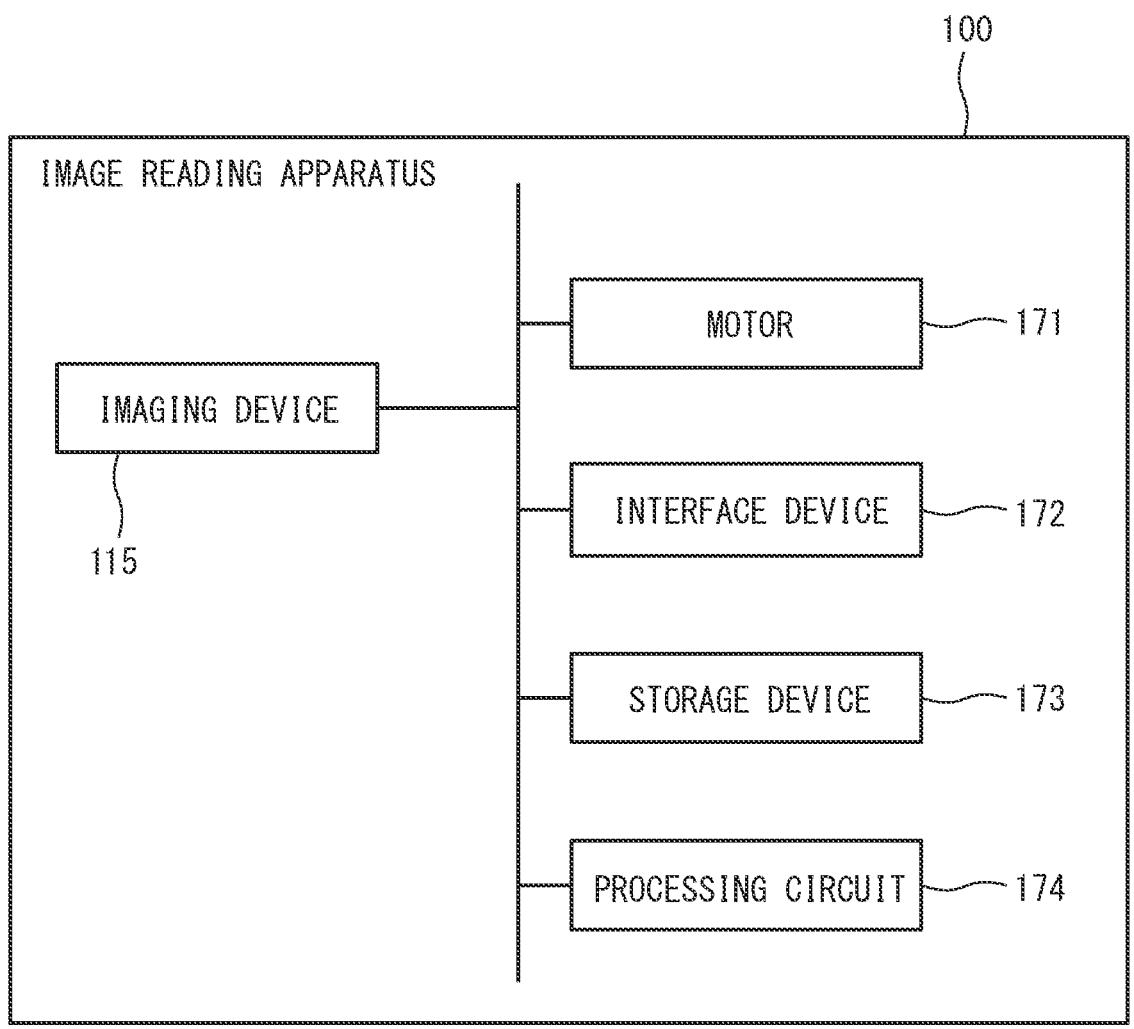
FIG. 13 is a block diagram illustrating a schematic configuration of the image reading apparatus 100.

FIG. 13 is a block diagram illustrating a schematic configuration of the image reading apparatus 100.

The image reading apparatus 100 further includes a motor 171, an interface device 172, a storage device 173, and a processing circuit 174, etc., in addition to the configuration described above.

The motor 171 includes one or a plurality of motors, and conveys a medium by rotating the feed roller 112, the retard roller 113, the first conveying roller 113 and the second conveying roller 116, by a control signal from the processing circuit 174.

For example, the interface device 172 includes an interface circuit conforming to a serial bus such as universal serial bus (USB). The interface device 172 communicates with an external information processing apparatus, and transmits and receives various types of images and information. Further, a communication device including an antenna transmitting and receiving wireless signals, and a wireless communication interface circuit for transmitting and receiving signals through a wireless communication line in conformance with a predetermined communication protocol may be used in place of the interface device 172. For example, the predetermined communication protocol is a wireless local area network (LAN).

The storage device 173 includes a memory device such as a random access memory (RAM) or a read only memory (ROM), a fixed disk device such as a hard disk, or a portable storage device such as a flexible disk or an optical disk. The storage device 173 stores computer programs, databases, tables, etc., used for various kinds of processing of the image processing apparatus 100. The computer program may be installed on the storage device 173 from a computer-readable, non-transitory medium such as a compact disc read only memory (CD-ROM), a digital versatile disc read only memory (DVD-ROM), etc., by using a well-known setup program, etc.

The processing circuit 174 operates in accordance with a program previously stored in the storage device 173. Instead of the processing circuit 174, a digital signal processor (DSP), a large scale integration (LSI), an application specific integrated circuit (ASIC), a field-programmable gate array (FPGA), etc., may be used.

The processing circuit 174 is connected to the imaging device 115, the motor 171, the interface device 172 and the storage device 173, etc., and controls each of these units. The processing circuit 174 drives the motor 171 to convey the medium. The processing circuit 174 controls the imaging device 115, to generate an input image acquired by imaging the conveyed medium while emitting light to the medium, and transmits it to the information processing apparatus (not shown) via the interface device 172.

As described in detail above, in the imaging device 115, the second end surface 152 of the light guide member 150 is not covered on the opposite side of the light emitting element 140 of each light source unit, and the medium side surface 131a, 131b of the reflective member 160 is located so as to protrude from the second end surface 152 of light guide member 150. Thus, the intensity of the light emitted from each position of each light source unit is uniform, and the imaging device 115 and the image reading apparatus 100 can uniformly emit the light to the medium.

Figure 14A:
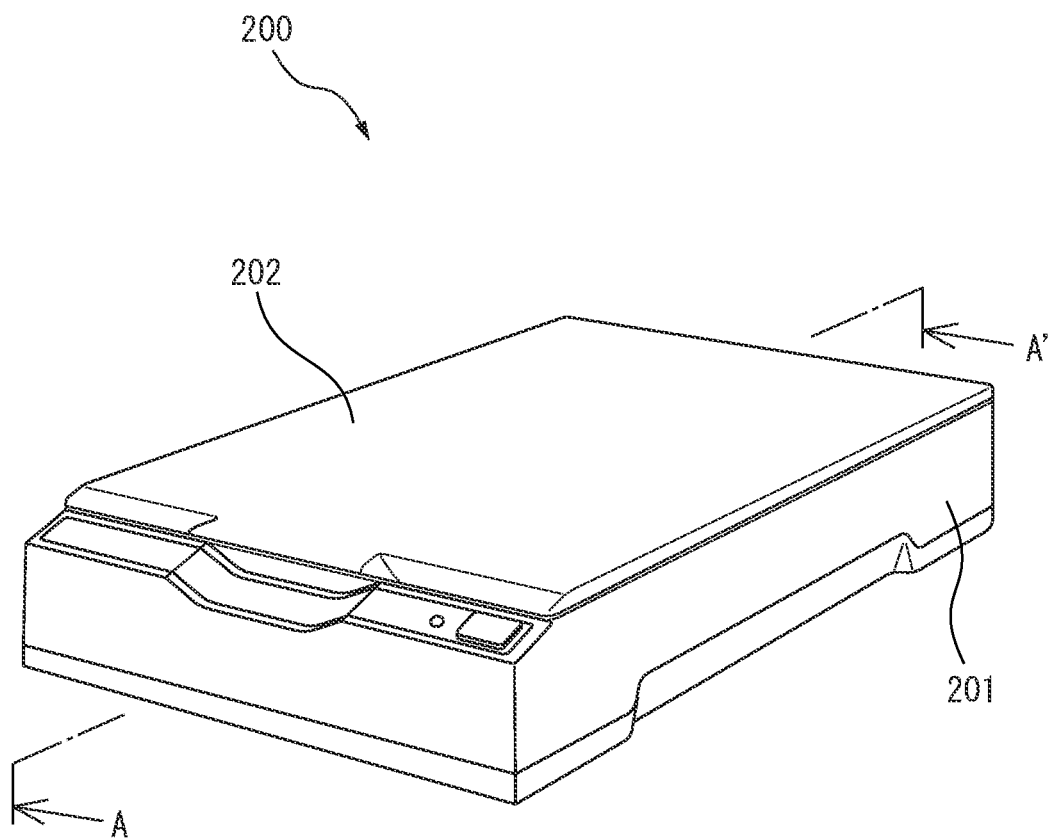
FIG. 14A is a configuration diagram of an example of an image reading apparatus 200 according to another embodiment.
Figure 14B:
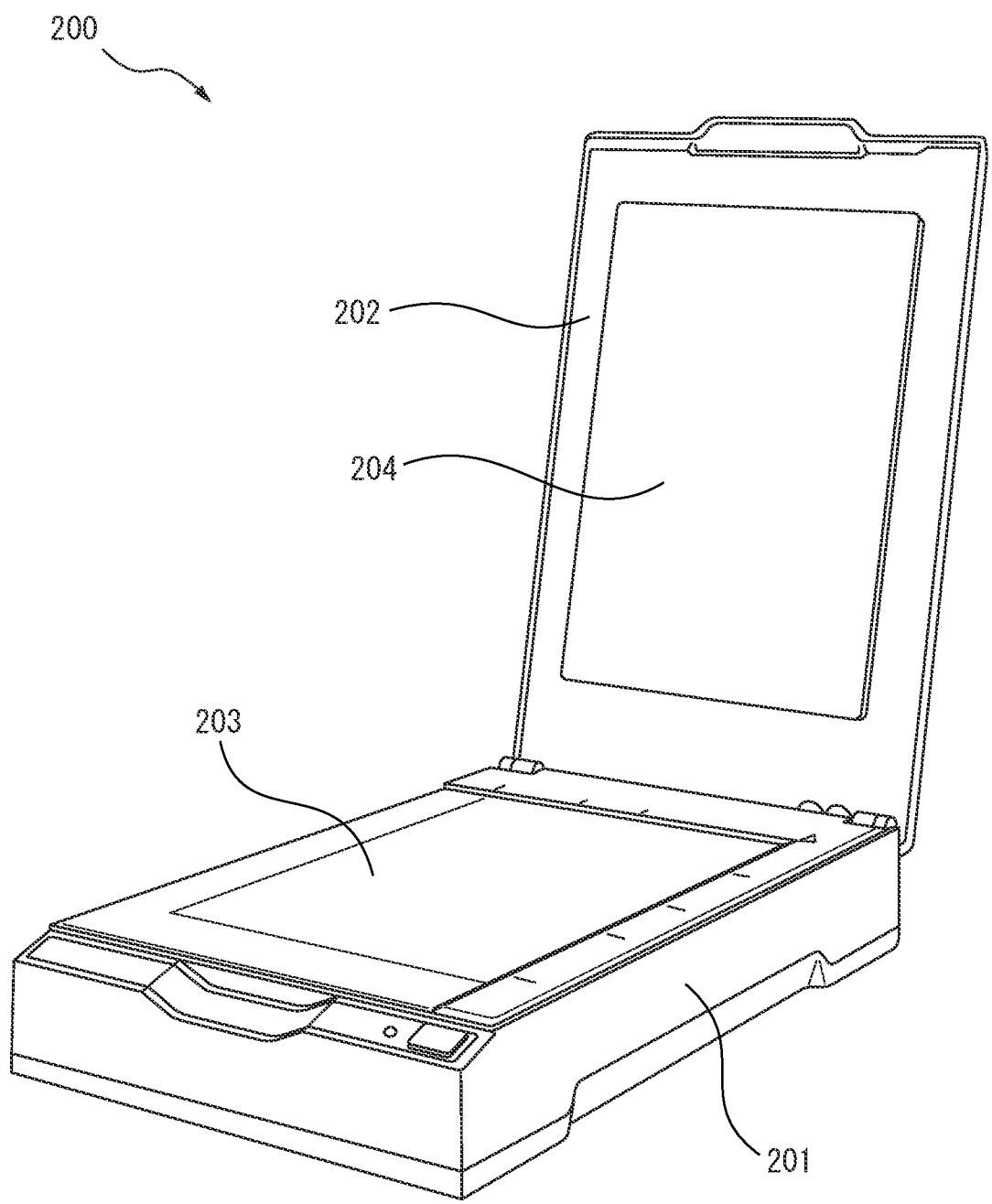
FIG. 14B is a configuration diagram of an example of the image reading apparatus 200 according to another embodiment.

The FIG. 14A and FIG. 14B are configuration diagrams of an example of an image reading apparatus 200 according to another embodiment. FIG. 14A is a perspective view of the image reading apparatus 200 in a state in which a cover 202 is open, and FIG. 14B is a perspective view of the image reading apparatus 200 in a state in which the cover 202 is closed.

As illustrated in FIG. 14A and FIG. 14B, the image reading apparatus 200 is, for example, a flatbed-type scanner, etc. The image reading apparatus 200 includes a housing 201, a cover 202, etc.

The housing 201 has a glass plate 203, etc. The glass plate 203 is a member for placing the medium, and is provided on an upper surface of the housing 201. The plate 203 forms a placing surface of the medium.

The cover 202 has a reference member 204, etc. The cover 202 is provided to be opened and closed with respect to the housing 201. In an open state, the cover 202 can place the medium on the glass plate 203 of the housing 201. In a closed state, the reference member 204 face the imaging device provided below the glass plate 203 (in the housing 201). A surface facing the imaging device of the reference member 204 has, similar to that of the first reference member 122a of the image reading apparatus 100, a white color. The image reading apparatus 200 executes an image correction such as shading correction, based on an image signal acquired by imaging the reference member 204.

Figure 15:
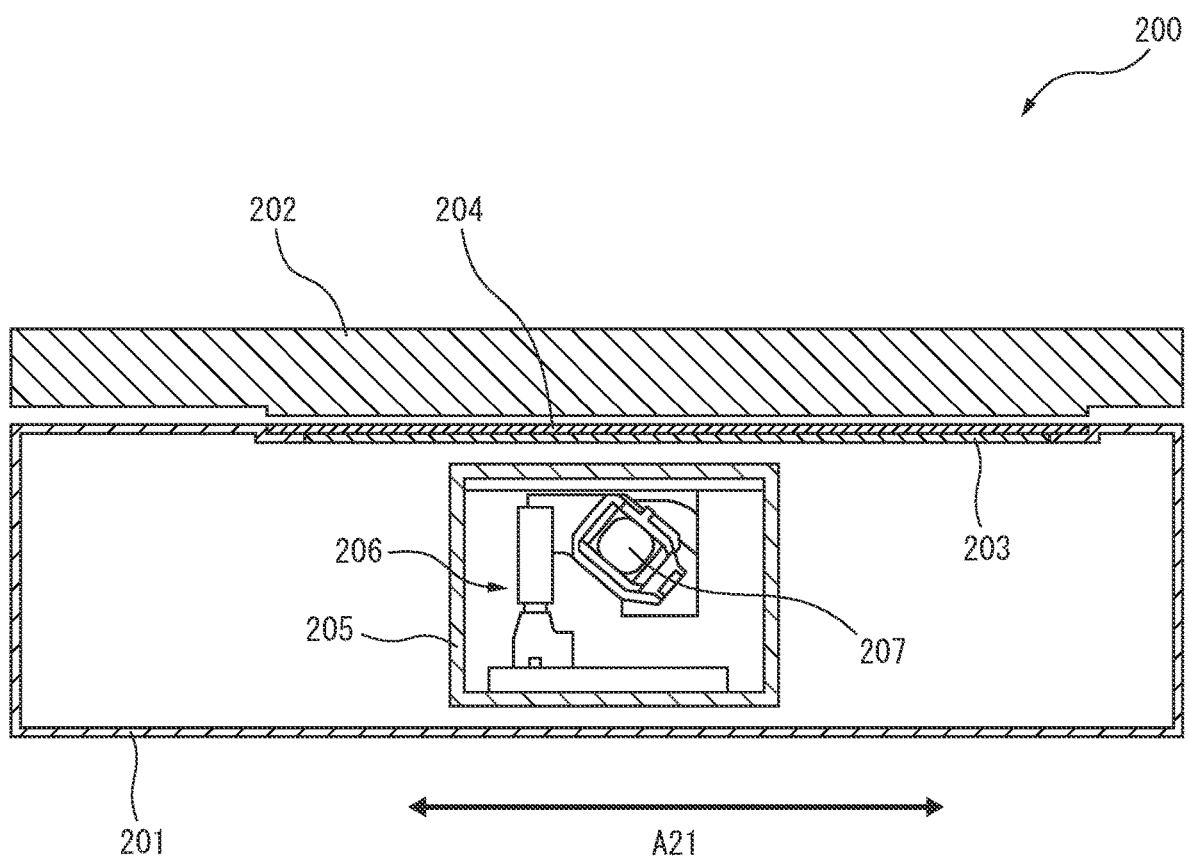
FIG. 15 is a cross-sectional view of the image reading apparatus 200.

FIG. 15 is a cross-sectional view taken along an A-A' line in FIG. 14A of the image reading apparatus 200 with the cover 202 in the closed state.

As illustrated in FIG. 15, the housing 201 has an imaging device 205. The imaging device 205 is provided at a position facing the reference member 204 provided on the cover 202 in the closed state, across the glass plate 203. The imaging device 205 is parallel to the glass plate 203 and extends so as to image from one end of the glass plate 203 to the other end in a direction perpendicular to a direction of arrow A21 in FIG. 15 (a main scanning direction). Further, the imaging device 205 is movably provided along a direction of arrow A21 (a sub-scanning direction) so as to image from one end of the glass plate 203 to the other end.

The imaging device 205 is an example of an imaging device, and image the medium placed on the glass plate 203. The Imaging device 205 includes an imaging unit 206 and a light source unit 207, etc.

The imaging unit 206 has a structure similar to that of the first imaging unit 121a of the image reading apparatus 100. The light source unit 207 is an example of a light source unit, and is located so as to be inclined with respect to a medium placing surface, to emit light to a medium placed on the glass plate 203. That is, the emitting direction of the light by the light source unit 207 is inclined (not perpendicular) with respect to the medium placing surface, and is inclined (not parallel) with respect to the imaging direction by the imaging unit 206. The light source unit 207 emits light toward the placed medium (toward the reference member 204 facing the light source unit 207 when a medium is not placed). The light source unit 207 has a structure similar to that of the first light source unit 130a of the image reading apparatus 100. However, in the light source unit 207, the medium placing surface corresponds to the medium conveying surface in the first light source unit 130a. In the light source unit 207, a side surface located on the medium placing surface side is a medium side surface, a side surface located on the opposite side of the medium side surface is a non-medium side surface.

The image reading apparatus 200 includes the respective portions of the image reading apparatus 100 illustrated in FIG. 13. However, the image reading apparatus 200 includes an imaging device 205, instead of the imaging device 115. Further, in the image reading apparatus 200, the motor 171 is provided so as to move the imaging device 205 through a moving mechanism such as a pulley, a belt, a gear, a rack, and a pinion, etc., rather than rotating a roller for conveying the medium. The processing circuit 174 drives the motor 171 to move the imaging device 205. The processing circuit 174 controls the imaging device 205, to generate an input image acquired by imaging the placed medium while emitting the light to the medium, and transmits it to the information processing apparatus (not shown) via the interface device 172.

As described in detail above, the imaging device 205 and the image reading apparatus 200 can uniformly emit the light to the medium even when imaging the medium by moving the imaging device 205.

According to the embodiment, the imaging device and the image reading apparatus can uniformly emit the light to the medium.

What is claimed is:

1. An imaging device comprising:
    an imaging sensor to image a medium; and
    a light source unit located to be inclined with respect to a medium conveying surface or a medium placing surface, to emit light to the medium; wherein
    the light source unit includes
        a light emitting element,
        a light guide provided with the light emitting element on a first end surface side to guide light emitted from the light emitting element in a predetermined direction, and emit the light toward the medium from an emitting surface extending in the predetermined direction, and
        a reflector located around the light guide other than the emitting surface, wherein
    the light guide includes a light diffusing surface on an opposite side to the emitting surface, wherein
    the reflector does not cover a second end surface opposite to the first end surface of the light guide, wherein
    a medium side surface of the reflector is located so as to protrude from the second end surface of the light guide, and wherein
    the second end surface of the light guide is located to protrude from a side surface opposite to the medium side surface of the reflector.

2. The imaging device according to claim 1, wherein the light diffusing surface is provided so as to extend to the second end surface of the light guide.

3. An image reading apparatus comprising:
    a conveyance roller to convey a medium;

an imaging sensor to image a medium; and a light source unit located to be inclined with respect to a medium conveying surface to emit light to the medium; wherein the light source unit includes a light emitting element, a light guide provided with the light emitting element on a first end surface side, to guide light emitted from the light emitting element in a predetermined direction, and emit the light toward the medium from an emitting surface extending in the predetermined direction, and a reflector located around the light guide other than the emitting surface, wherein the light guide includes a light diffusing surface on an opposite side to the emitting surface, wherein the reflector does not cover a second end surface opposite to the first end surface of the light guide, wherein a medium side surface of the reflector is located so as to protrude from the second end surface of the light guide, and wherein the second end surface of the light guide is located to protrude from a side surface opposite to the medium side surface of the reflector.

4. An image reading apparatus comprising:

an imaging device; and a motor to move the imaging device, wherein the imaging device includes an imaging sensor to image a medium, and a light source unit located to be inclined with respect to a medium placing surface to emit light to the medium, wherein the light source unit includes a light emitting element, a light guide provided with the light emitting element on a first end surface side, to guide light emitted from the light emitting element in a predetermined direction, and emit the light toward the medium from an emitting surface extending in the predetermined direction, and a reflector located around the light guide other than the emitting surface, wherein the light guide includes a light diffusing surface on an opposite side to the emitting surface, wherein the reflector does not cover a second end surface opposite to the first end surface of the light guide, wherein a medium side surface of the reflector is located so as to protrude from the second end surface of the light guide, and wherein the second end surface of the light guide is located to protrude from a side surface opposite to the medium side surface of the reflector.

5. The image reading apparatus according to claim 3, wherein the light diffusing surface is provided so as to extend to the second end surface of the light guide.

6. The image reading apparatus according to claim 4, wherein the light diffusing surface is provided so as to extend to the second end surface of the light guide.

* * * * *